(12) United States Patent
Sarwat et al.

(10) Patent No.: US 10,326,280 B1
(45) Date of Patent: Jun. 18, 2019

(54) DISTRIBUTED RENEWABLE ENERGY GRID CONTROLLER

(71) Applicants: Arif Sarwat, Miami, FL (US); Aditya Sundararajan, Miami, FL (US)

(72) Inventors: Arif Sarwat, Miami, FL (US); Aditya Sundararajan, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/129,974

(22) Filed: Sep. 13, 2018

(51) Int. Cl.
  G05B 13/04    (2006.01)
  G05B 13/02    (2006.01)
  H02J 3/38     (2006.01)
  H02J 3/00     (2006.01)

(52) U.S. Cl.
  CPC ............ H02J 3/383 (2013.01); G05B 13/027 (2013.01); G05B 13/041 (2013.01); G05B 13/048 (2013.01); *H02J 2003/003* (2013.01); *H02J 2003/007* (2013.01)

(58) Field of Classification Search
  CPC ............... H02J 3/383; H02J 2003/007; H02J 2003/003; G05B 13/048; G05B 13/041; G05B 13/027
  See application file for complete search history.

(56) References Cited

U.S. PATENT DOCUMENTS

| | | | |
|---|---|---|---|
| 2013/0024014 A1* | 1/2013 | Sharma | G05B 17/02 700/29 |
| 2015/0012144 A1* | 1/2015 | Wang | H02J 3/00 700/291 |

OTHER PUBLICATIONS

Maita et al. "Interior Point Methods in Optimal Power Flow solvers comparison using Matlab" from "Conferencias Hispano Lusas de Ingenieria Electrica, 2013" (Year: 2013).*
Maita et al., "Interior Point Methods in Optimal Power Flow Solvers Comparison Using Matlab", Conferencias Hispano Lusas de Ingenieria Electric.A, 2013.
Akbari et al., "Linear Approximated Formulation of AC Optimal Power Flow using Binary Discretisation", IET Generation, Transmission & Distribution, 2016, pp. 1117-1123, vol. 10, Issue 5.
Maheswari et al. "Implementation of an Optimization Technique for Improving Power Quality in the System", Indian Journal of Computer Science and Engineering, 2012, pp. 277-281, vol. 3, No. 2.

* cited by examiner

*Primary Examiner* — Yuhui R Pan
(74) *Attorney, Agent, or Firm* — Saliwanchik, LLoyd & Eisenschenk (57) ABSTRACT

Devices and methods related to a grid-connected RES power plant are provided. A device can include a controller configured to: apply a logarithmic barrier function using natural logarithm to a general primal and dual linear programming function; select a point comprising a point in real space, a Lagrangian multiplier, and a slack variable, such that the point in real space is feasible for positive primal solution and both the Lagrangian multiplier and slack variable are feasible for a dual solution; and iteratively solve for an optimal solution for allocation of renewable energy into a grid-connected RES power plant.

20 Claims, 5 Drawing Sheets

Algorithm 1 Convexify, linearize and relax NLP ACOPF problem

1: procedure CONVEXIFY AND LINEARIZE THE ORIGINAL ACOPF: (*Apply the following to the non-convex line active and reactive power constraints, and line thermal limit constraints*)
2:     First-order Taylor series expansion
3:     Binary expansion discretization
4:     Piecewise linear approximation
5: procedure RELAX THE RESULTING LP FORMULATION OF ACOPF: (*Apply a BC algorithm*)
6:     while *active nodes remain in the tree* do
7:         Solve for sub-problem, relax integer constraints
8:         Determine incumbent solution $IS$ to objective function
9:         Compute MIP Gap between $IS$ and optimal solution $OS$
10:         while *cuts can be applied* do
11:             if $OS$ violates cut(s) then
12:                 Add the violated cut(s) to that node, go to Step 7
13:         if node becomes infeasible then
14:             Prune from tree
15:             Go to Step 24
16:         if (node satisfies integral constraints && $OS < IS$) then
17:             $IS \leftarrow OS$
18:             Go to Step 24
19:         else apply heuristics to infer new incumbent
20:         if Step 18 is True then
21:             Branch the node into new nodes
22:             Mark them as "active"
23:             Go to Step 24
24: procedure RELAX INTEGER VARIABLES OF RESULTING ACOPF: (*Apply Primal Dual Log Barrier IPM*)
25:     Apply PDLB-IPM
26:     Rewrite minimization function by adding log-barrier
27:     Select a point $(x_0, \lambda_0, \eta_0)$ s.t. $x_0$ is feasible for primal, $(\lambda_0, \eta_0)$ is feasible for dual
28:     for $l$ from 0 do
29:         Determine primal-dual Newton direction $(x', \lambda', \eta')$ using (19)
30:         Use new Newton direction from Step to determine step-length $\alpha$ by minimizing log-barrier subject to $Ax = n$
31:         Perform step update: $(x_{l+1}, \lambda_{l+1}, \eta_{l+1}) = (x_l, \lambda_l, \eta_l) + \alpha(x', \lambda', \eta')$

DISTRIBUTED RENEWABLE ENERGY GRID CONTROLLER

STATEMENT OF GOVERNMENT SUPPORT

This invention was made with government support under Grant No. 1553494 awarded by the National Science Foundation. The government has certain rights in the invention.

BACKGROUND

While customer demand at a power grid distribution network remains relatively predictable during a day, quick morning ramp-ups and late afternoon ramp-downs in grid-connected Renewable Energy Source (RES) power plants without secondary power sources to help demand in a real-time manner pose a severe threat to the stability of the grid and the availability of power to customers. Existing technologies that deal with problems of such magnitude are based on unreliable weather prediction and ineffective modeling, making the overall grid performance unreliable and inefficient.

This necessitates the need for a solution that synergistically integrates novel computational tools for smart RES generation forecasting and wide-area aggregation, optimization for providing dynamic RES hosting capacity, intelligent device synchronization, and on-demand ability to dispatch; complemented by state-of-the-art situationally aware visualization capable of providing in-depth operational visibility for real-time monitoring of the grid with complete accessibility to the entire grid.

BRIEF SUMMARY

Embodiments of the subject invention provide systems and methods for integrating large-scale distributed grid-connected Renewable Energy Source (RES) power plants across a smart grid and sustaining their benefits, through a holistic controller that comprises predictive and prescriptive computation models to address and mitigate three pressing concerns facing the high-penetration scenarios of the RESs into the grid through three technological modules: (1) optimization models to tackle the intermittencies in the generation of RESs at sub-second speeds in order to leverage maximum performance and cost benefits from over 80% of existing RESs; (2) delivering operational visibility for analysts and operators at the utilities' Command and Control Centers (CCCs) down to the customer-level to enable dispatch for bulk energy transfer and accomplish demand-side functionalities using smart RES inverters and a Hybrid Energy Storage System (HESS) comprising a Li-ion battery and supercapacitor with advanced Energy Management System (EMS) that minimizes RES curtailment and enhances RES hosting capacity in distribution feeders; (3) tackling the issue of RES generation intermittency and unpredictability through wide-area aggregation methods supported by intelligent short-term generation forecasting models; and (4) providing intelligent synchronization and coordination among smart power electronics such as smart inverters in the field, which would ensure autonomous restoration of failures at customer-levels without human intervention, thereby reinforcing the self-healing principle of the smart grid.

BRIEF DESCRIPTION OF DRAWINGS

FIG. 3 is an algorithm used to take an original NLP form of ACOPF and arrive at its relaxed form.

DETAILED DESCRIPTION

The following disclosure and exemplary embodiments are presented to enable one of ordinary skill in the art to make and use a holistic controller for intelligent operation of a distributed renewable grid, according to the subject invention. Various modifications to the embodiments will be apparent to those skilled in the art and the generic principles herein may be applied to other embodiments. Thus, the devices and methods related to the holistic controller are not intended to be limited to the embodiments shown, but are to be accorded the widest scope consistent with the principles and features described herein.

Increasing the penetration of grid-tied solar photovoltaic (PV) sources beyond acceptable thresholds in the future calls for solving complex, nonlinear power system methods such as optimal power flow (OPF) and economic dispatch at greater frequencies to address its fluctuating generation. This requires the models to always converge quickly to a global optimum. Currently, heuristic models, which converge quickly, but do not guarantee optimality are used. On the other hand, deterministic models guarantee solution optimality but converge slowly. Thus, there is a need for models that both converge quickly as well as ensure optimality. To achieve this, a primal and dual log-barrier interior point method (PDLB-IPM) for a transmission grid-tied PV system can be used by considering alternating current optimal power flow (ACOPF).

Generation from traditional systems based on nuclear and fossil fuels does not vary rapidly with time. Hence, problems like voltage fluctuations, harmonics, faults, and overloading can be handled with a certain level of accuracy, given the generators possess enough inertia to keep the system running. However, a volatile source of power like grid-tied solar photovoltaic (PV) source tends to quickly change system dynamics, since its output relies heavily on the extent of cloud cover and cloud velocity, both of which vary with wind velocity, atmospheric pressure and ambient temperature.

For PV plants of sizes between 1 and 30 MW, initial studies conducted have revealed typical fluctuations of up to between 90% and 70% per minute respectively. Standardized fluctuations per minute are stipulated at not more than 10% per minute by utilities such as the Puerto Rico Electric Power Authority (PREPA) for its grid-tied PV plants. With no inertial capabilities, the PV output drops within a few seconds when clouds block the sunlight and hikes when the clouds drift away.

By increasing PV plant sizes (from around 1-6 MW to 25 MW), the impact of irradiance-induced fluctuations can be minimized. However, this solution may not be feasible in all settings. Further, increasing system size might prove detrimental to the grid it ties into, thus raising interconnection issues such as voltage and frequency distortions. Although the problem is manageable under the existing penetration levels of PV, this could evolve into a serious concern in the future where majority of the grid's power comes from such intermittent sources, connected both at transmission lines (more than 33% of peak load as a rule of thumb) as well as distribution feeders (more than 50% of peak load as a general rule of thumb).

Vacillation in PV generation dictates an enormous threat to the infrastructure of the future grid since it would make solving for voltage fluctuations, harmonics, flickers and faults difficult. Such sources of power typically serve relatively stable and predictable demands. Thus, economic dispatch and unit commitment can be employed to adequately respond to fluctuations by scheduling secondary sources of generation that supply deficit power or absorb the surplus. The scheduling and dispatch of secondary generation is done based on the variables of the grid, PV energy, and storage, for which an alternating current optimal power flow (ACOPF) must first be performed. Although functions such as OPF are currently performed at least every five minutes preceding the contingency analysis (CA) for transmission systems, higher frequencies ranging from a few tens of seconds for post-contingency might be required in the future systems with high penetration levels of PV based power due to rapidly changing characteristics and states induced by their intermittent generation.

Hence, there is a significant need for these power system methods to be solved in an accelerated manner. At the same time, the solutions must be accurate, since decisions made based on less than-optimal solutions could aggravate power quality and reliability issues. Accuracy of optimization problems like ACOPF or economic dispatch is determined by whether the solution is a global optimum or not. Hence, the objective is for the problems to be solved quickly as well as accurately. While most methods in the literature employ heuristic and metaheuristic models such as Particle Swarm Optimization (PSO), Genetic Algorithm (GA) and other Evolutionary Algorithms (EAs), they do not always converge to an optimal solution, despite solving the problem quickly.

Deterministic models, on the other hand, aim to always deliver a global optimum, which makes them converge slower. However, methods like ACOPF cannot afford either slow convergence or non-optimal solutions.

PDLB-IPM can be applied to relax a branch-and-cut mixed integer linear programming (BC-MILP) problem to accelerate its convergence. This method can generate a sequence of strictly positive primal and dual solutions to its problems and converges when it finds feasible primal and dual solutions which are complementary. A general primal dual LP problem can be written as follows, with its primal and dual components.

Primal: min $m^T x$; $Ax=n, x \geq 0$

Dual: max $n^T \lambda$; $A^T \lambda + \eta = m$, $\eta \geq 0$, (1)

where m and n are variables in real space and $\lambda$ is a Lagrangian multiplier.

A logarithmic barrier function using natural logarithm can be applied to the primal problem that can be written as:

$$L_B(x, \mu) = m^T x - \mu \sum_{i=1}^{k} \ln x_i; \mu > 0, \quad (2)$$

where $L_B$ is the Log-Barrier function and i and k are binary variable indices.

Now, instead of solving the original problem, the barrier function can be solved for subject to the condition $Ax=n$. The Lagrangian $L(.)$ for this problem can be defined as:

$$L(x, \lambda, \mu) = m^T x - \mu \sum_{i=1}^{k} \ln x_i - \lambda^T (Ax - n), \quad (3)$$

where $L(.)$ is the Lagrangian.

Here, the slack variable $\eta$ is defined as $\mu X^{-1} e$, where X is a diagonal matrix$[x_1, \ldots, x_k]$ and e is the matrix $[1, 1, \ldots, 1]^T$. The solutions of these problems (x; $\lambda$; $\eta$) are characterized by the KKT conditions:

$A^T \lambda + \eta = m$, $Ax = n$, $x \geq 0$, $\eta \geq 0$, $x_i \eta_i = 0, 1 \geq i \geq K$, (4)

where $\eta$ is a slack variable and K is the number of transmission lines.

It is imperative that as $\mu \to 0$, the optimal solution to the barrier approaches closer to that of the original minimization problem. This problem is then solved by repeatedly undertaking Newton steps that reduce the current barrier function, and then decreasing $\mu$ in the next iteration. Unlike strictly primal methods, this method computes, for (x; $\lambda$; $\eta$), the Newton direction (x'; $\lambda$'; $\eta$'). The primal Newton algorithm can be rewritten using a dual problem as follows:

$$\begin{bmatrix} 0 & A^T & I \\ A & 0 & 0 \\ N & 0 & X \end{bmatrix} \begin{bmatrix} x' \\ \lambda' \\ \eta' \end{bmatrix} = \begin{bmatrix} -(A^T \lambda + \eta - m) \\ -(Ax - n) \\ -(XNe - \mu e) \end{bmatrix} \quad (5)$$

FIG. 3 shows the steps used to take the original nonlinear programming (NLP) form of ACOPF and arrive at its relaxed form. System state variables can be updated based upon complimentary positive primal and dual solutions. The steps have been kept generic in accordance with the above discussion. To establish a clear performance comparison between primal dual interior point nonlinear programming (PDIP-NLP), BC-MILP and PDLB-IPM, different metrics are identified. Convergence time in this context is the measure of the number of cycles it takes for an optimization model to obtain a globally optimal solution. Since models are deterministic, they almost always converge to global optimum after the same number of cycles. This, hence, forms a direct measure of the speed of convergence for ACOPF. Normalized number of iterations is the number of iterations the optimization model undergoes before it stabilizes at the global optimum. Since the iteration limits for CPLEX (referring to IBM ILOG CPLEX Optimization Studio) and PDIPM solvers are different, being 2147483647 and 150 respectively, a normalization of the number of iterations can be used for an effective comparison. To achieve this, z-scores can be used. The z-scores are computed from the mean and standard deviation of the complete population of a dataset. A z-score of +k indicates that the value is k standard deviations above the mean of 0, and a score of k indicates that the value is k standard deviations below the mean of 0. The z value can be computed as follows:

$$z = \frac{d - \check{d}}{\sigma}, \quad (6)$$

where z is the z-score normalized value for a data point, d is a data point from the population space, ď is the population mean, and σ is the population standard deviation.

The percentage error between two models, where one is baseline and the other is estimated, can be defined as the percentage of margin between the baseline (exact) and estimated, with respect to the baseline:

$$\%_{error} = \frac{|d - d'|}{d} \times 100 \quad (7)$$

Figure 1:
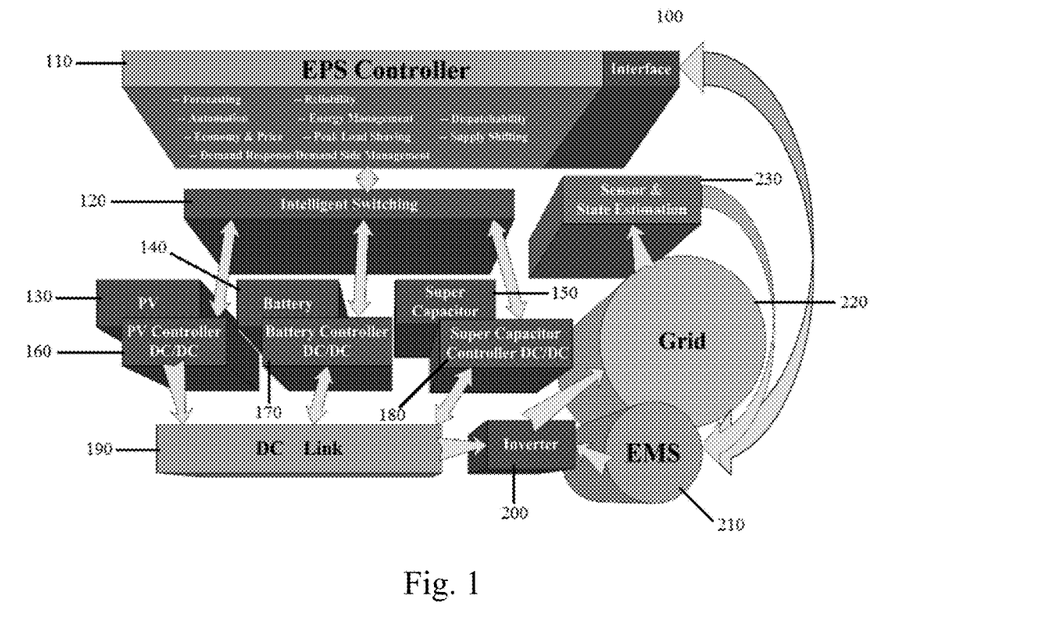
FIG. 1 is a diagram of a RES power plant illustrating an exchange of information between components of the RES power plant.

FIG. 1 illustrates a system 100 that can implement the features and methods described above. A controller 110 can be configured to execute the features described above and include a processor, an interface, a memory device, a storage device, and a communication interface.

The controller 110 can be configured to execute a dispatch for a bulk energy transfer using the HESS 140, 150, which is connected to an advanced EMS 210 that minimizes the RES curtailment and dynamically increases the RES's hosting capacity in a connected distribution feeder. The controller 110 can be configured to perform advanced frequency analysis of a RES power plant and HESS 140, 150 intermittencies. The advanced frequency analysis help manage a confluence of a RES 130, a battery 140, and supercapacitors 150 across a wide-area network to address dispatch requirements on-demand and in a dynamic manner. Furthermore, the EMS 210 can incorporate an adaptive cell balancing technique that utilizes the supercapacitors 150 to enhance energy efficiency and reusability in HESS 140, 150. The use of supercapacitors 150 can increase promptness of the on-demand dispatch capability of any distributed energy resources (DERs). A decoupled active and reactive (P-Q) power control technique can be employed and enable the RESs 130 to effectively generate/consume desired active and reactive power to/from power grid 220 on-demand. This can be achieved by operating the RESs 130 in a four-quadrant mode in the P-Q plane.

Virtual Inertia (VI)-based control of RESs 130 utilizing HESS 140, 150 technology can provide reliable and stable grid integration and enable maximum hosting capacity in distribution power grids. VI-based control comprises controlling the interconnection of RESs 130 as a synchronous machine. HESS 140, 150 technology enables smart RES inverters to respond to power control requirements that are determined by a VI controller. A power-frequency model based on swing equation to design and develop VI controller can be used, in which a Phase-Locked Loop (PLL) measures the grid frequency to establish a VI response to changes in the grid frequency.

The controller 110 can be configured to use a wide-area aggregation technique that employs a wavelet theory-based transformation model and a cooperative game theoretic model to conduct advanced intermittency analysis to enhance the predictability of RES generation intermittencies. The results of the advanced intermittency analysis can show the effect of the aggregation of (1) utility-scale and rooftop PV systems on the dynamics of the grid; and (2) the management of a PV fleet for optimal grid performance.

A RES 130 coupled with HESS 140, 150 can provide the capabilities to employ supply shifting and peak load shaving for a smart grid 220. By using predictive smart load control, the EMS 210 effectively makes use of RES 130 and HESS 140, 150 to address any critical and deferrable load and minimize any instability in the system. A set of adaptive algorithms can be employed to dynamically respond to changes in load demand. Furthermore, the automation control of the system can be equipped with security protection against several load re-distribution attacks.

The controller 110 can be configured to have functionalities related to energy pricing and economics of the grid-connected RES power plant. The controller 110 can ensure the feasibility of intelligence and visibility of the RES 130 in terms of load flow, long and short-term pricing and supply. The controller 110 can further allow specific high-quality energy supplies to be distributed to any specific location at the feeder or sub-feeder levels of the system or individual customer locations.

The controller 110 can be configured to provide demand-side functionalities to utility companies. As power generation and demand are accurately predictable and point-to-point delivery can be achieved, selective supply and demand control can be employed at the feeder, sub feeder and/or customer level. The controller 110 can be configured to work conjunction with utility-level applications like the Distributed Energy Resource Management System (DERMS) and the Integrated Distribution Management System (IDMS) for enhancing the effective, optimal use of existing RES power plants.

The controller can be configured to reduce interruptions in the power supply to the consumers by utilized intelligent control algorithms. A predictive software algorithm can be implemented over a wide area at different management areas.

The memory device can include volatile memory such as random-access memories (RAM, DRAM, SRAM), and non-volatile memory such as flash memory, various read-only-memories (ROM, PROM, EPROM, EEPROM), magnetic and ferromagnetic/ferroelectric memories (MRAM, FeRAM). The storage device can include magnetic and optical storage devices (hard drives, magnetic tape, CDs, DVDs); network devices; or other media now known or later developed that can store computer-readable information/data.

The communication interface (not pictured) can include a communications port, a wired transceiver, a wireless transceiver, and/or a network card. The communication interface can communicate using various communication technologies such as Ethernet, fiber optics, microwave, xDSL (Digital Subscriber Line), Wireless Local Area Network (WLAN) technology, cellular, Bluetooth technology and/or any other technology configured to provide communication throughout the system.

The controller 110 can be connected to an intelligent switching device 120, which can include a processor, a memory device, a storage device, a communication interface, and software to execute protocols, enable switching, and distribute instructions between respective power source controllers 160, 170, and 180.

Each power source controller 160, 170, and 180 can be connected to a respective power source including a photovoltaic plant 130, a battery bank 140, and a super capacitor 150. The battery bank 140 and the supercapacitor 150 can form a hybrid energy storage system (HESS). The power source controllers 160, 170, and 180 can transmit power to a DC link 190. The DC link 190 can include solid state technology, rectifiers, diodes or other appropriate technology for converting an AC power signal to a DC power signal. The DC link 190 can be further configured to manipulate the DC signal to be more suitable for use. The controller 110 can also be in communication with intelligent electronic devices of a grid-connected RES power plant (not shown).

The DC link 190 can transmit the manipulated DC signal to an inverter 200 to convert the DC signal back to an AC signal for transmission to a power grid 220. The grid 220 can be connected to sensors 230 for sensing power and load related parameters. The sensors 230 can transmit information via a communication network to an energy management system 210, which in turn can transmit a signal to the inverter 200. The energy management system 210 can be configured to be in electronic communication with the controller 110 to transmit and receive feedback information from the controller 110. The energy management system 210 can include a processor, an interface, a memory device, a storage device, and a communication interface and software capable of monitoring and directing power generation and transmission.

The controller 110 can be configured to: (1) execute a dispatch for a bulk energy transfer, engage in peak load shaving; (2) support functionalities for energy pricing and economics of the grid-connected RES power plant; (3) provide demand-side functionalities to utility companies; and (4) reduce interruptions in power supply to the consumers through intelligent control. The controller 110 can further configured to perform predictive analysis of consumer demand and draw inferences from a power generation profile. Moreover, the controller 110 can receive electronic communication comprising historical and real-time weather patterns, and historical and real time power consumption.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

OPF is a general problem formulation that looks for an optimal solution to a specific objective function subject to the power flow and other operational constraints such as generator minimum output constraints, transmission stability and voltage, while satisfying those constraints dictated by operational and physical particulars of modern power networks. The objective functions can either maximize social welfare or minimize generation cost for transmission systems and minimize real power losses for distribution systems. While approximating the ACOPF problem as a linear direct current OPF (DCOPF) might help solving it faster, its solutions will not be applicable for the real-world system which is nonlinear and considers reactive power. Due to this very reason, ACOPF is a complex, non-convex, nonlinear non-polynomial hard (NP-hard) problem.

The following equations represent the standard ACOPF in polar power-voltage formulation used in power systems, where the objective function is to minimize the cost of generation. As can be seen, this is a nonlinear and non-convex problem due to constraints on the active power, reactive power, and thermal limit across the line between the buses of the system. The cost of generation usually includes that generating both real as well as reactive power. This is different from DCOPF which ignores reactive power terms, voltage angle constraints and bus voltage magnitude constraints. Federal Energy Regulatory Commission (FERC) presents an objective function that includes costs of both real as well as reactive power, proceeding to use piecewise linear functions to approximate the cost function.

$$C(S)=C(P)+C(Q), \qquad (8)$$

where S is a set of apparent powers across J buses $[s_1, \ldots, s_J]^T$, P is a set of real powers across J buses $[p_1, \ldots, p_J]^T$, C(.) is the cost of generation, and Q is a set of reactive powers across J buses $[q1, \ldots, q_J]^T$. When C(Q)=0 and C(P) is a quadratic expression; the objective function can be rewritten as:

$$\min C(S) = \min \sum_{a \in J} x_a P_a^2 + y_a P_a + z_a, \qquad (9)$$

where $x_a$, $y_a$, and $z_a$ are weights or coefficients of the real power generation cost as bus a in the ACOPF objective function In its polar form, ACOPF also has nonlinear equality and linear inequality constraints, which are listed below. The equality constraints are concerned with real and reactive power injected at a bus a, while the inequality constraints specify the bounds for active and reactive power, voltage and the phase angle at buses a and b.

$$p_a = \sum_{a \in J} \sum_{b \in J} v_a v_b [u_{ab} \cos\theta_{ab} + w_{ab} \sin\theta_{ab}], \quad (10)$$

where $p_a$ is the real power from bus a, $v_a$ and $v_b$ are a from voltage a bus a to bus b respectively, $\theta_{ab}$ is the voltage angle difference between bus a and bus b, and $w_{ab}$ is the susceptance across buses a and b and an element of W, where W is a J×J susceptance matrix.

$$q_a = \sum_{a \in J} \sum_{b \in J} v_a v_b [u_{ab} \sin\theta_{ab} + w_{ab} \cos\theta_{ab}], \quad (11)$$

where $q_a$ is the reactive power from bus a and $u_{ab}$ is the conductance across bus a and b and an element of U, where U is a J×J conductance matrix.

$$v_a^{min} \leq v_a \leq v_a^{max}, \forall a \in J, \quad (12)$$

where $v_a^{min}$ is the minimum voltage across bus a and $v_a^{max}$ is maximum voltage at bus a.

$$p_a^{min} \leq p_a \leq p_a^{max}, \forall a \in J, \quad (13)$$

where $P_a^{min}$ is the minimum injected/absorbed real power at bus a and $P_a^{max}$ is the maximum injected/absorbed power real power at bus a.

$$q_a^{min} \leq q_a \leq q_a^{max}, \forall a \in J, \quad (14)$$

where $q_a^{min}$ is the minimum injected/absorbed reactive power at bus a and $q_a^{max}$ is the maximum injected/absorbed power reactive power at bus a.

$$\theta_{ab}^{min} \leq \theta_{ab} \leq \theta_{ab}^{max}, \forall a, b \in J, \quad (15)$$

where $\theta_{ab}^{min}$ is the minimum voltage angle difference between bus a and bus b and $\theta_{ab}^{max}$ is the maximum voltage angle difference between bus a and bus b.

$$p_{ab}^2 + q_{ab}^2 \leq s_{ab} \leq (s_{ab}^{max})^2, \forall a, b \in J, \quad (16)$$

where $p_{ab}$ is the real power flow from bus a to bus b, $q_{ab}$ is the reactive power flow from bus a to bus b, $s_{ab}$ is the apparent power between bus a and bus b, and $s_{ab}^{max}$ is the apparent power between bus a and bus b.

Further, for a given bus a∈J, the following can enforce active and reactive power balances:

$$p_a^+ - p_a^- = \sum_{b \in J} p_{ab}, \quad (17)$$

where $p_a^+$ is the injected real power into bus a and $p_a^-$ is the absorbed real power from bus a.

$$q_a^+ - q_a^- = \sum_{b \in J} q_{ab}, \quad (18)$$

where $q_a^+$ is the injected reactive power into bus a and $q_a^-$ is the absorbed reactive power from bus a.

The conductance and susceptance matrices grow sparser with the increase in number of buses and transmission lines. In general, the density of its conductance and susceptance matrices is given as:

$$\Phi = \frac{card(J) + 2K}{card(J)^2} \quad (19)$$

where $\Phi$ is the density of conductance and susceptance matrices for a J bus system and card(.) is the cardinality of a set.

For example, a density of the matrices $\Phi$ for a 9-bus system with nine buses and six lines is 0.26, while that for a 14-bus system is 0.22. As the system is scaled higher, density drops further, which can be approximated to 3/B.

Figure 2:
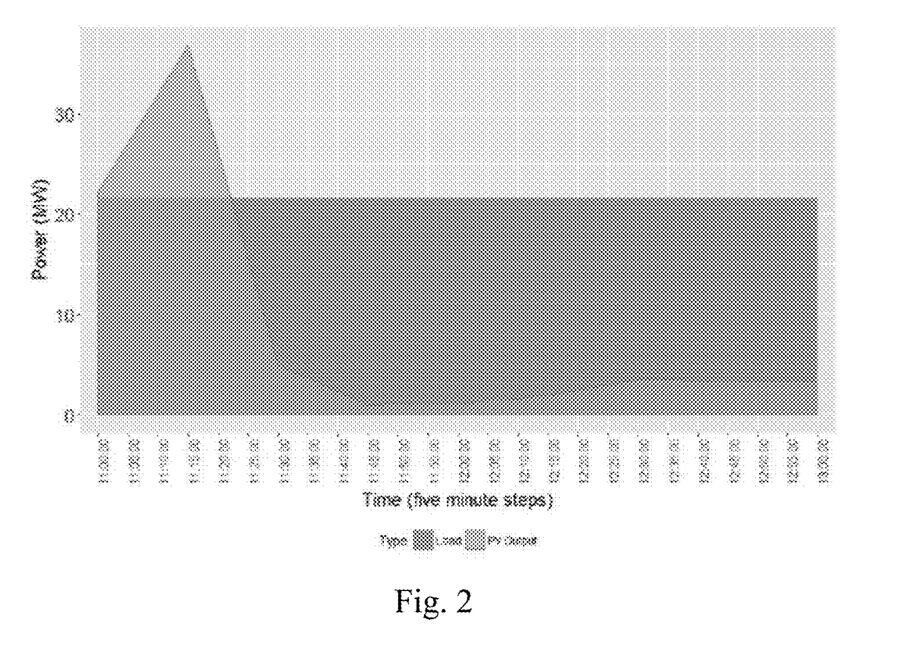
FIG. 2 is a plot of a sample of a solar generation profile vs. load curve for Miami from 11 am to 1 pm.

In order to implement and evaluate the different ACOPF solvers, five standard IEEE transmission systems (with 5, 14, 30, 57, and 118 buses) were considered. Each system denotes a higher scale and hence, complexity. In each of these systems, one of the generators was modeled as PV with its generation profile mirroring that shown in FIG. 2. While the topology of the systems was retained, only one of the synchronous generators was replaced by PV. Further, the generation capacity and profile were adjusted based on the average load profiles observed for a specific region in Miami, Fla. The adjustment was such that the penetration level of the PV into that bus was at least 60% of the observed average peak load, thus constituting a futuristic high penetration scenario. This modification ensures that simulation results described herein are brought closer to a real-world application. The load profile was constructed by averaging profiles for three months over a period of two hours, from 11 AM through 1 PM. For this case, the average load (in blue) remained constant at around 21 MW, but installed PV generation increased from 21 MW to 36 MW between 11:00 AM and 11:15 AM. PV generation drops from 36 to 4.8 MW in the next fifteen minutes.

Simulations were performed multiple times with same settings and after refreshing the caches of the software and the average of their values was used as the result to minimize if not remove the inconsistencies in the processing power and speed of the system. This processed data was used to construct the time-series input data for both the ACOPF solvers (PDIPM and CPLEX) described herein. This data represents only the average load and PV profiles for a region in Miami, but not the instantaneous values for any specific date or month.

Example 2

Figure 4:
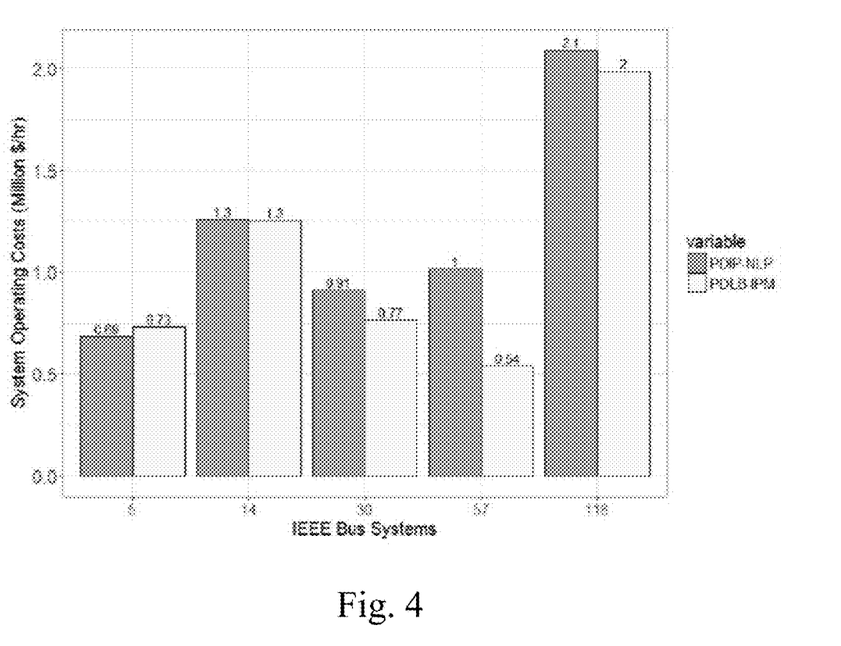
FIG. 4 is a bar graph of the optimal values for the objective function provided by PDIP-NLP and PDLB-IPM.
Figure 5:
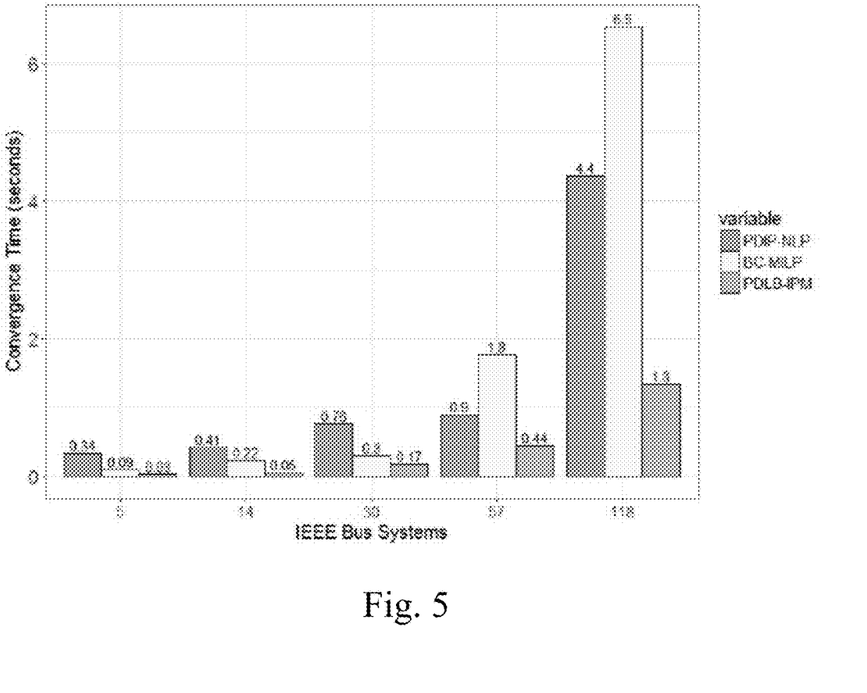
FIG. 5 is a bar graph of convergence time between PDIP-NLP, BC-MILP and PDLB-IPM across five bus systems.

Simulations were conducted on a single machine, an HP laptop with an Intel Core i5-3230M CPU at 2:6 GHz with an installed RAM of 8 GB. The operating system was Windows 8, running on a 64-bit machine powered by x64-based processor. To simulate PDIP-NLP, MATPOWER 5.1, an add-on package of MATLAB, was used. In order to simulate PDLB-IPM and BC-MILP, AIMMS 4.0 was used. Results obtained from the use of two different software applications are still comparable because convergence times and attainment of optimal solutions are dependent on the algorithms used by the solvers, but not the software application powering these algorithms. The values of the objective function solved by PDIP-NLP and PDLB-IPM for different IEEE systems is shown in Table 1 and FIG. 4. Both the methods converge to nearly the same optimal solution, dictated by the %-error margins that range from as low as 0.314% to as high as 46.84% for different systems. The optimized cost is lower for the proposed PDLB-IPM than the baseline (PDIP-NLP), especially for larger number of buses. This suggests that the proposed method is more scalable in nature. These results were averaged by repeating the study multiple times to reduce variability due to system factors. Between PDIP-NLP, PDLB-IPM and BC-MILP, the convergence times (recorded in seconds) is tabulated in Table 2 and shown in FIG. 5 for different systems. For smaller number of buses, PDLB-IPM performs the fastest, followed by BC-MILP, and then PDIP-NLP. However, as the number of buses increases from 30 to 57, BC-MILP shows a remarkably slower convergence speed when compared to PDIP-NLP. This is because of increasing number of integer variables that increases the computational complexity and hence delays convergence. However, PDLB-IPM still significantly has a faster convergence time, since some or all integer variables are relaxed.

TABLE 1

Objective function values for PDIP-NLP vs. PDLB-IPM ($/Hr)

| Buses | PDIP-NLP | PDLB-IPM | %-Error Margin |
|---|---|---|---|
| 5 | 68656.36 | 73271.39955 | 6.722 |
| 14 | 125900.85 | 125505.4287 | 0.314 |
| 30 | 91384.668 | 76707.16249 | 16.061 |
| 57 | 1013067.1 | 538545.4287 | 46.84 |
| 118 | 118 2088966.7 | 1986547.895 | 4.903 |

TABLE 2

Convergence times of PDIP-NLP, BC-MILP, PDLB-IPM (seconds)

| Buses | PDIP-NLP | BC-MILP | PDLB-IPM |
|---|---|---|---|
| 5 | 0.34 | 0.09 | 0.03 |
| 14 | 0.41 | 0.22 | 0.05 |
| 30 | 0.76 | 0.3 | 0.17 |
| 57 | 0.9 | 1.76 | 0.44 |
| 118 | 4.37 | 6.53 | 1.34 |

Figure 6:
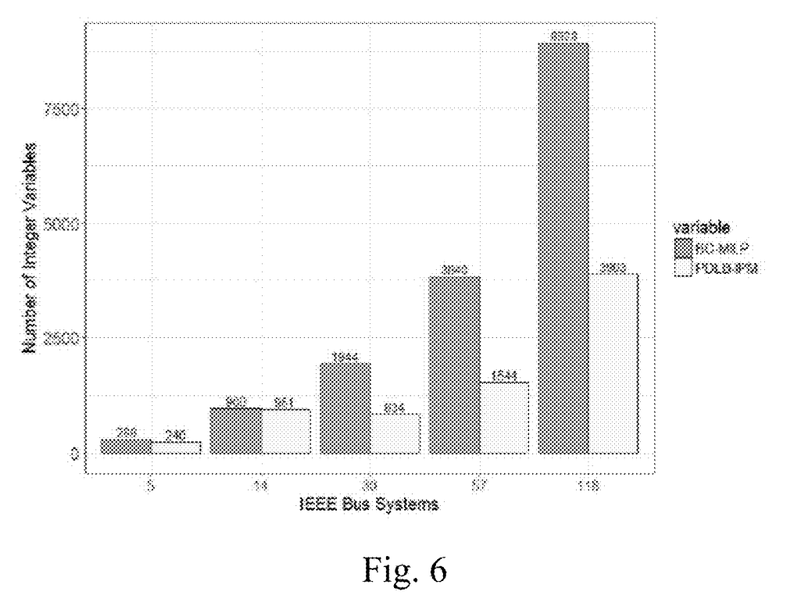
FIG. 6 is a bar graph of the number of integer variables in BC-MILP and PDLB-IPM.
Figure 7:
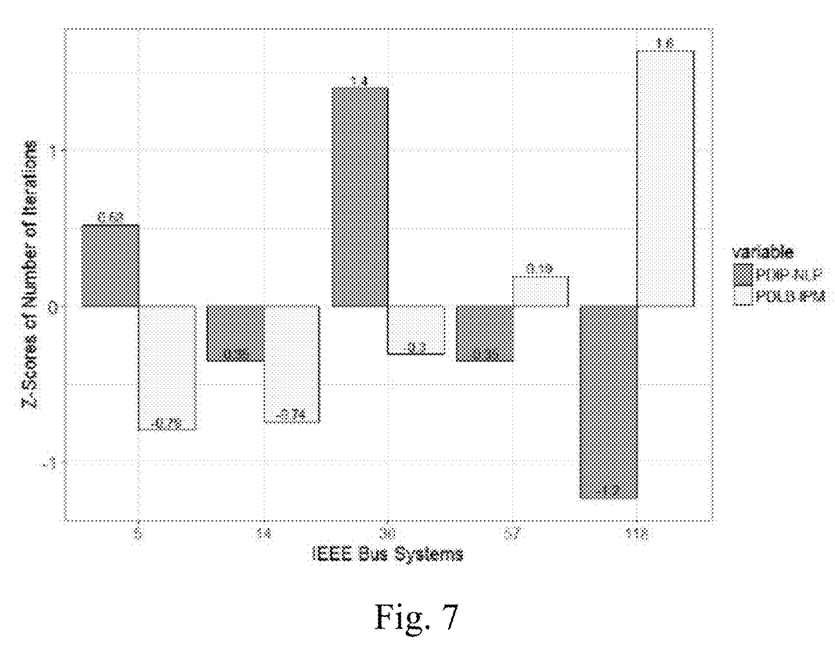
FIG. 7 is a bar graph of the normalized number of iterations between PDIP-NLP and PDLB-IPM.

As the system is scaled, convergence time for PDLB-IPM increases only by a factor of 1.3. However, BC-MILP increases by a factor of 6.4 and PDIP-NLP increases by a factor of 4, clearly showing that the latter two methods do not scale well. This implies that PDLB-IPM is not only faster to solve is also scalable. The number of integer variables in the problem was found to increase with system size, as shown in FIG. 6, where the number increased nearly linearly from 288 to 8928, which was a lot lesser than the number of integer variables observed in BC-MILP. Number of iterations for BC-MILP was almost the same as that for PDLB-IPM. However, as seen in Table 3, the number of iterations increased with an increase in number of buses. Since the iteration limits for CPLEX and MATPOWER are vastly different, the values were normalized to obtain z-scores, shown in FIG. 7.

TABLE 3

Number of Iterations and Normalized Z-Scores

| Buses | NLP | PDLB | NLP Z-score | PDLB Z-score |
|---|---|---|---|---|
| 5 | 16 | 154 | 0.526 | −0.793 |
| 14 | 14 | 588 | −0.351 | −0.739 |
| 30 | 18 | 4047 | 1.403 | −0.303 |
| 57 | 14 | 7998 | −1.228 | 1.642 |
| 118 | 16 | 154 | 0.526 | −0.793 |

Embodiment of subject invention provided a PDLB-IPM method which is shown to have a faster convergence than other methods, scales well with system size as demonstrated by various IEEE bus systems all of which were simulated by considering one of the generators as PV, and also converges to a global optimum.

In order to validate this method for such a scenario, the case study of ACOPF is demonstrated, considering a transmission grid-tied PV system with nearly 50% to 60% penetration level. Realistic load profile and PV generation profile for a period of two hours was collected for Miami, Fla., to conduct this experiment. The ACOPF with an objective of minimizing cost of generation is solved by first convexifying and linearizing the problem using BC algorithm and then relaxing its integer variables using a PDLB-IPM. The method significantly reduced the number of integer variables, but also guaranteed optimality being a deterministic method by nature.

The examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A controller for a grid-connected renewable energy source (RES) power plant, comprising:
    a plurality of sensors configured to sense power generation characteristics from a grid-connected RES power plant and load characteristics of consumers of the grid-connected RES power plant; and
    a non-transitory computer readable medium in operable communication with the plurality of sensors and comprising stored instructions that when executed cause at least one processor to:
    receive, by a receiving device, the power generation characteristics from the grid-connected RES power plant and the load characteristics of the consumers of the grid-connected RES power plant,
    perform an alternating current optimal power flow (ACOPF) analysis on the grid-connected RES power plant by performing the following:
    characterize a need for a high-speed convergence of the ACOPF analysis in terms of a general primal and dual linear programming function, the general primal and dual linear programming function being as follows:

Primal: min $m^T x$; $Ax=n, x \geq 0$

Dual: max $n^T \lambda$; $A^T \lambda + \eta = m$, $\eta \geq 0$, where m and n are variables in real space and $\lambda$ is a Lagrangian multiplier;
apply a logarithmic barrier function using natural logarithm to the general primal and dual linear programming function, the logarithmic barrier function ($L_B$) being as follows:

$$L_B(x, \mu) = m^T x - \mu \sum_{i=1}^{k} \ln x_i; \mu > 0,$$

where i and k are binary variable indices;
select a point comprising a point in real space, the Lagrangian multiplier, and a slack variable, such that the point in real space is feasible for a positive primal solution and both the Lagrangian multiplier and slack variable are feasible for a dual solution, the Lagrangian multiplier (L) being defined as follows:

$$L(x, \lambda, \mu) = m^T x - \mu \sum_{i=1}^{k} \ln x_i - \lambda^T (Ax - n),$$

and the slack variable $\eta$ being defined as $\mu X^{-1} e$, where X is a diagonal matrix $[x_1, \ldots, x_k]$ and e is matrix $[1, 1, \ldots, 1]^T$;
solve for the logarithmic barrier function by iteratively applying a Newton method of optimization to reduce each current logarithmic barrier function and decreasing the logarithmic barrier function with each iteration, the solution being characterized by the following conditions:

$A^T \lambda + \eta = m,$ $Ax = n,$ $x \geq 0,$ $\eta \geq 0,$ $x_i \eta_i = 0, 1 \geq i \geq K,$ where K is a number of transmission lines; and
calculate complimentary positive primal and dual solutions;
update system state variables based upon the complimentary positive primal and dual solutions; and
direct power output from a plurality of power sources of the grid-connected RES power plant to a power grid based upon the updated state variables.

2. The controller of claim 1, the plurality of power sources comprising a renewable energy source, a battery bank, and a supercapacitor; and the battery bank and the supercapacitor forming a hybrid energy storage system (HESS).

3. The controller of claim 2, the non-transitory computer readable medium comprising stored instructions that when executed further cause at least one processor to:
predict an amount of power generated by the grid-connected RES power plant for a specified time period using a Long Short-Term Memory (LTSM) neural network and based on historical data of local weather patterns;
predict an amount of consumer demand for power generated by the grid-connected RES power plant for the specified time period using historical data of energy consumption patterns;
solve an optimization problem to determine an optimal combination of power output of each power source of the plurality of power sources,
a solution of the optimization problem accounting for reduction of power costs for the consumers demanding power, outputting power to meet the power demands of the consumers, an amount of ramp-ups and ramp-downs in a power generation profile for the specific time period, available power from battery bank and supercapacitor, and any grid conditions determined by solving for the ACOPF analysis; and
transmit, by a transmitting device, an optimum solution of allocation of power output by each power source of the plurality of power sources.

4. The controller of claim 1, the non-transitory computer readable medium comprising stored instructions that when executed further cause at least one processor to:
execute a dispatch for a bulk energy transfer using a hybrid energy storage system coupled to an energy management system,
the energy management system employing a adaptive cell balancing technique and a decoupled active and reactive (P-Q) technique;
engage in peak load shaving;
support functionalities for energy pricing and economics of the grid-connected RES power plant;
provide demand-side functionalities to utility companies through; and
reduce interruptions in power supply to the consumers through intelligent control.

5. The controller according to claim 2, further comprising:
a plurality of power controllers, each configured to be connected to a respective power source of the plurality of power sources;
an inverter for interfacing at least one power source of the plurality of power sources with a grid of the grid-connected RES power plant and for transmitting to and receiving from a signal with at least one power source controller of the plurality of power source controllers;
a command and control center for transmitting a signal to the inverter;
a plurality of intelligent electronic devices in electronic communication with the controller; and
an energy management system configured to be in electronic communication with the controller and to receive state information of the grid-connected RES power plant from the plurality of sensors and the plurality of intelligent electronic devices.

6. The controller according to claim 1, the plurality of sensors being connected to a first bus of the grid-connected RES power plant.

7. The controller according to claim 6, the plurality of sensors being configured to sense at least one of a maximum voltage at the first bus of the grid-connected RES power plant, a minimum voltage at the first bus of the grid-connected RES power plant, an injected real power into the first bus of the grid-connected RES power plant, an absorbed real power from the first bus of the grid-connected RES power plant, an absorbed reactive power from the first bus of the grid-connected RES power plant, and a voltage at the first bus of the grid-connected RES power plant.

8. The controller according to claim 5, the plurality of sensors being connected to a second bus of the grid-connected RES power plant.

9. The controller according to claim 8, the plurality of sensors being further configured to sense at least one of a maximum voltage angle difference between the first bus and the second bus of the grid-connected RES power plant, a minimum voltage angle difference between the first bus and the second bus of the grid-connected RES power plant, a maximum apparent power between the first bus and the second bus of the grid-connected RES power plant, a conductance across the first bus and the second bus of the grid-connected RES power plant, a susceptance across the first bus and the second bus of the grid-connected RES power plant, a real power flow from the first bus and the second bus of the grid-connected RES power plant, and a reactive power flow from the first bus and the second bus of the grid-connected RES power plant.

10. The controller according to claim 1, the controller being configured to be electrically connected to and located physically remotely from a plurality of photovoltaic power sources.

11. The controller according to claim 2, the renewable energy source comprising a photovoltaic power source.

12. A grid-connected RES power plant, comprising:
a controller comprising a non-transitory computer readable medium;
a plurality of sensors configured to sense power generation characteristics of a grid-connected RES power plant and load characteristics of consumers of the grid-connected RES power plant;
a photovoltaic cell, a battery, and a super capacitor, each configured to be connected to a respective power source controller of a plurality of power source controllers;
an inverter for interfacing at least one power source of a plurality of power sources with a grid of the grid-connected RES power plant and for transmitting to and receiving from a signal with at least one power source controller of the plurality of power source controllers; and
an energy management system configured to be in electronic communication with the controller and to receive state information of the grid-connected RES power plant from the plurality of sensors and a plurality of intelligent electronic devices,
the non-transitory computer readable medium comprising stored instructions that when executed cause at least one processor to:
receive, by a receiving device, the power generation characteristics of the grid-connected RES power plant and the load characteristics of the consumers of the grid-connected RES power plant,
perform an alternating current optimal power flow (ACOPF) analysis on the grid-connected RES power plant by performing the following:
characterize the need for high-speed convergence of the ACOPF analysis in terms of a general primal and dual linear programming function, the general primal and dual linear programming function being as follows:

Primal: min $m^T x$; $Ax=n, x \geq 0$

Dual: max $n^T \lambda$; $A^T \lambda + n = m$, $\eta \geq 0$, where m and n are variables in real space and $\lambda$ is a Lagrangian multiplier;
apply a logarithmic barrier function using natural logarithm to the general primal and dual linear programming function, the logarithmic barrier function ($L_B$) being as follows:

$$L_B(x, \mu) = m^T x - \mu \sum_{i=1}^{k} \ln x_i; \mu > 0,$$

where i and k are binary variable indices;
select a point comprising a point in real space, the Lagrangian multiplier, and a slack variable such that the point in real space is feasible for a positive primal solution and both the Lagrangian multiplier and slack variable are feasible for a dual solution, the Lagrangian multiplier (L) being defined as follows:

$$L(x, \lambda, \mu) = m^T x - \mu \sum_{i=1}^{k} \ln x_i - \lambda^T (Ax - n),$$

and the slack variable $\eta$ being defined as $\mu X^{-1} e$, where X is a diagonal matrix $[x_1, \ldots, x_k]$ and e is matrix $[1, 1, \ldots, 1]^T$;
solve for the logarithmic barrier function by iteratively applying a Newton method of optimization to reduce each current logarithmic barrier function and decreasing the logarithmic barrier function with each iteration, the solution being characterized by the following conditions:

$A^T \lambda + \eta = m$, $Ax = n$, $x \geq 0$, $\eta \geq 0$, $x_i \eta_i = 0, 1 \geq i \geq K$, where K is a number of transmission lines; and
calculate complimentary positive primal and dual solutions; and
update system state variables based on the complimentary positive primal and dual solutions.

13. A method for operation of a grid-connected RES power plant, comprising:
sensing, by a plurality of sensors, power generation characteristics of a grid-connected RES power plant and load characteristics of consumers of the grid-connected RES power plant;
providing a non-transitory computer readable medium comprising stored instructions that when executed cause at least one processor to:
receive, by a receiving device, the power generation characteristics of the grid-connected RES power plant and the load characteristics of the consumers of the grid-connected RES power plant,
perform an alternating current optimal power flow (ACOPF) analysis on the grid-connected RES power plant by performing the following:
characterize the need for high-speed convergence of the ACOPF analysis in terms of a general primal dual and linear programming function, the general primal and dual linear programming function being as follows:

Primal: min $m^T x$; $Ax=n, x \geq 0$

Dual: max $n^T \lambda$; $A^T \lambda + n = m$, $\eta \geq 0$, where m and n are variables in real space and $\lambda$ is a Lagrangian multiplier;

apply a logarithmic barrier function using natural logarithm to the general primal and dual linear programming function, the logarithmic barrier function ($L_B$) being as follows:

$$L_B(x, \mu) = m^T x - \mu \sum_{i=1}^{k} \ln x_i; \mu > 0,$$

where i and k are binary variable indices;
select a point comprising a point in real space, the Lagrangian multiplier, and a slack variable such that the point in real space is feasible for a positive primal solution and both the Lagrangian multiplier and slack variable are feasible for a dual solution, the Lagrangian multiplier (L) being defined as follows:

$$L(x, \lambda, \mu) = m^T x - \mu \sum_{i=1}^{k} \ln x_i - \lambda^T (Ax - n),$$

and the slack variable $\eta$ being defined as $\mu X^{-1} e$, where X is a diagonal matrix $[x_1, \ldots, x_k]$ and e is matrix $[1, 1, \ldots, 1]^T$;
solve for the logarithmic barrier function by iteratively applying a Newton method of optimization to reduce each current logarithmic barrier function and decreasing the logarithmic barrier function with each iteration, the solution being characterized by the following conditions:

$A^T \lambda + \eta = m,$ $Ax = n,$ $x \geq 0,$ $\eta \geq 0,$ $x_i \eta_i = 0, 1 \geq i \geq K,$ where K is a number of transmission lines; and
calculate complimentary positive primal and dual solutions;
update system state variables based on the complimentary positive primal and dual solutions, and
direct power output from a plurality of power sources of the grid-connected RES power plant to a power grid based upon the updated state variables.

14. The method of claim 13, further comprising adjusting a power output of each power source of a plurality of power sources connected to the grid-connected RES power plant based on the complimentary positive primal and dual solutions.

15. The method of claim 13, further comprising connecting the plurality of sensors to a first bus of the grid-connected RES power plant.

16. The method of claim 15, further comprising configuring the plurality of sensors to sense at least one of a maximum voltage at the first bus of the grid-connected RES power plant, a minimum voltage at the first bus of the grid-connected RES power plant, an injected real power into the first bus of the grid-connected RES power plant, an absorbed real power from the first bus of the grid-connected RES power plant, an absorbed reactive power from the first bus of the grid-connected RES power plant, and a voltage at the first bus of the grid-connected RES power plant.

17. The method of claim 16, further comprising connecting the plurality of sensors to a second bus of the grid-connected RES power plant.

18. The method of claim 17, further comprising configuring the plurality of sensors to sense at least one of a maximum voltage angle difference between the first bus and the second bus of the grid-connected RES power plant, a minimum voltage angle difference between the first bus and the second bus of the grid-connected RES power plant, a maximum apparent power between the first bus and the second bus of the grid-connected RES power plant, a conductance across the first bus and the second bus of the grid-connected RES power plant, susceptance across the first bus and the second bus of the grid-connected RES power plant, real power flow from the first bus and the second bus of the grid-connected RES power plant, and a reactive power flow from the first bus and the second bus of the grid-connected RES power plant.

19. The method of claim 13, further comprising:
executing a dispatch for a bulk energy transfer;
engaging in peak load shaving;
supporting functionalities for energy pricing and economics of the grid-connected RES power plant;
providing demand-side functionalities to utility companies; and
reducing interruptions in power supply to the consumers through intelligent control.

20. The method of claim 13, the plurality of sensors being configured to sense respective power generation and load characteristics of a plurality of grid-connected RES power plants, the method further comprising:
receiving respective power generation characteristics of each grid-connected RES power plant of the plurality of grid-connected RES power plants and respective load characteristics of consumers of each grid-connected RES power plant of the plurality of grid-connected RES power plants; and
performing an alternating current optimal power flow (ACOPF) analysis on each grid-connected RES power plant of the plurality of grid-connected RES power plants.

* * * * *